Figure 2:
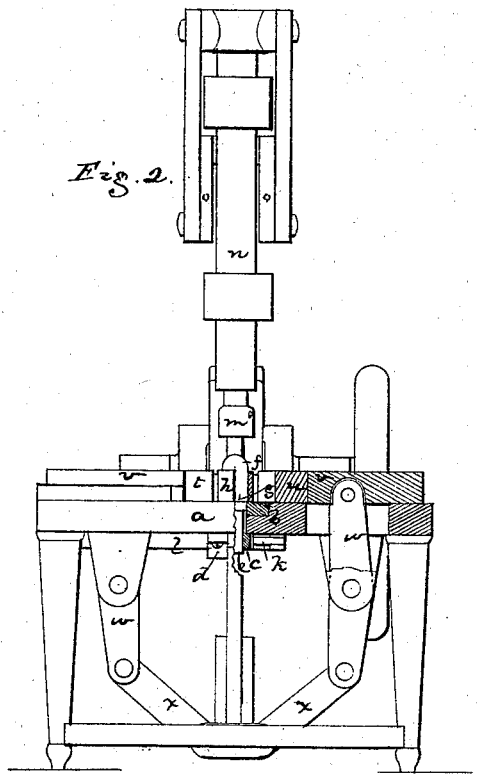
Figure 2:
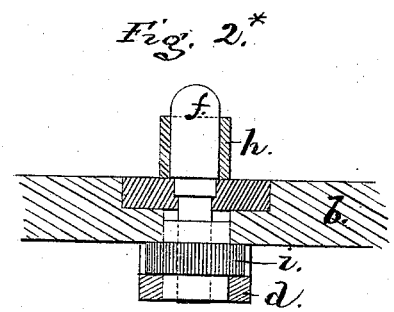

2 Sheets--Sheet 1.
G. H. FOX.
Machines for Welding and Forming Couplings.
No. 151,215. Patented May 26, 1874.
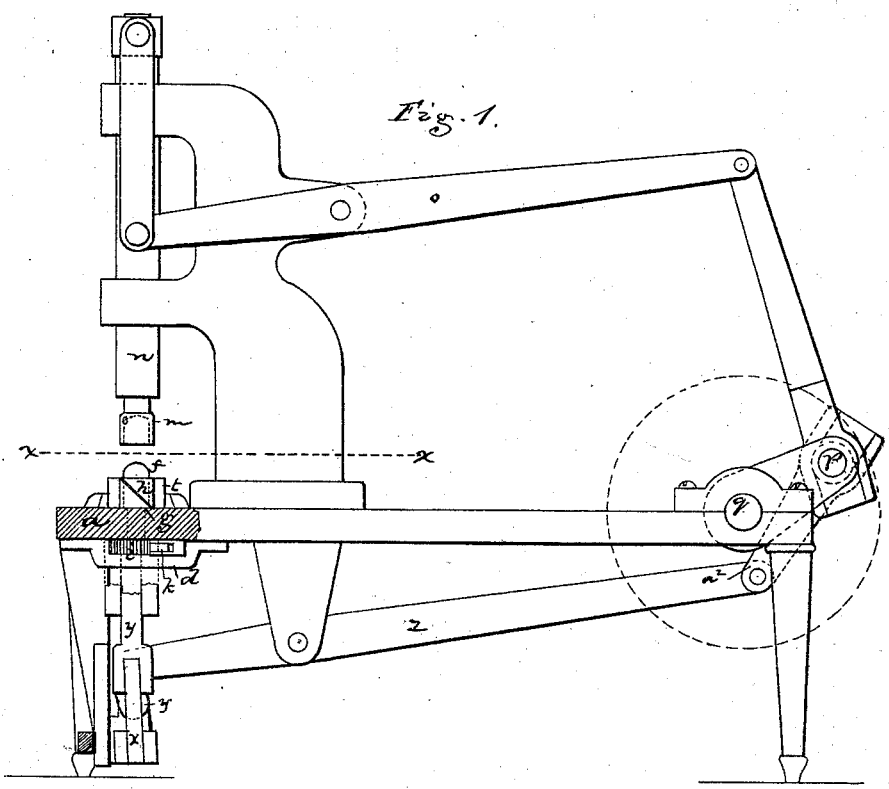
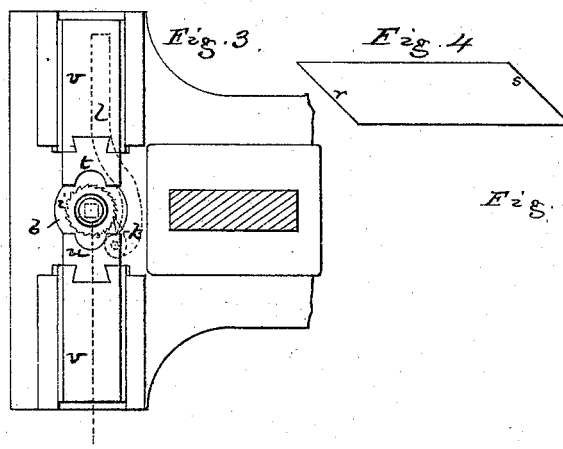
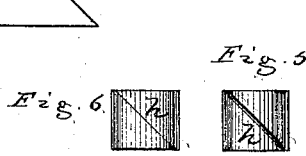
Witnesses.
M. W. Frothingham.
L. H. Latimer.
Inventor.
George H. Fox.
By his Attys
Crosby & Gould G. H. FOX.
Machines for Welding and Forming Couplings.
No. 151,215. Patented May 26, 1874.

2 Sheets--Sheet 2.

Witnesses.
M. W. Frothingham.
L. H. Latimer.

Inventor.
George H. Fox,
By his Atty.
Crosby & Gould.

UNITED STATES PATENT OFFICE.

GEORGE H. FOX, OF BOSTON, MASSACHUSETTS.

IMPROVEMENT IN MACHINES FOR WELDING AND FORMING COUPLINGS.

Specification forming part of Letters Patent No. 151,215, dated May 26, 1874; application filed May 6, 1873.

*To all whom it may concern:*

Be it known that I, GEORGE H. FOX, of Boston, in the county of Suffolk and State of Massachusetts, have invented an Improvement in Machines for Welding Rings for Couplings, &c.; and I do hereby declare that the following, taken in connection with the drawings which accompany and form part of this specification, is a description of my invention sufficient to enable those skilled in the art to practice it.

The invention relates to a new method of welding the ends of metal blanks to form tubes for coupling and other purposes. Such tubes are usually formed by scarfing the ends of the blank and lap-welding them; but as the tubes have subsequently to be shaped upon a mandrel, the process is slow and the manufacture expensive.

In my method, I cut the metal to the form of a parallelogram with inclined ends, and when the strip is bent these ends butt. The blank thus bent I place upon a pin of the diameter of the tube to be formed, said pin extending up from a suitable bed, and having a square or angular shank entering a corresponding socket in the bed or socket piece, said socket-piece being intermittently rotated and the pin and blank rotating with it. Over the pin is a vertically-reciprocating tubular driver, and as said driver descends it strikes the blank and, pressing it down, welds the two edges or the overhanging inclined edge to the edge beneath it, the blank being at a welding-heat. On the table at opposite sides of the pin are two sliding dies, having die-surfaces corresponding in conjunction to the outer diameter of the tube to be formed. After the driver or header descends, and as it rises, the dies move forward and press the blank against the former-pin, and the header then descends and the dies again move forward, and so on, until the tube at this one operation is welded and shaped, the pin and tube having between the consecutive actions of the dies upon it, a rotative movement, by which means its whole surface is acted upon. When the tube is thus finished, the pin is removed, and by striking the tube a few sharp blows with a hammer, or by other suitable means, it is loosened and dislodged from the pin.

The invention consists in this method of forming the tube, and in the mechanism employed in practicing the same.

The drawing represents a machine for forming such tubes.

Figure 1 shows the machine in side and sectional elevation. Fig. 2 is a front and sectional elevation; and Fig. 2*, an enlarged view of the former-pin and its adjacent parts. Fig. 3 is a sectional plan on the line $xx$. Fig. 4 shows the blank as cut from the plate. Fig. 5 shows it as bent and ready for welding. Fig. 6 shows the welded blank.

$a$ denotes a table placed on suitable supports. Set into this table is a bed, $b$, and beneath this bed is a rotating socket-piece, $c$, necked into a bearing, $d$, and having a square or other suitably-shaped socket for receiving and confining the shank $e$ of the cylindrical former-pin $f$. The shoulder $g$ of this pin rests on the bed $b$, and the pin receives the blank $h$, or the blank encompasses the pin, and rests upon the bed. The socket-piece bears a ratchet, $i$, with which engages a pawl, $k$, said pawl being jointed to a slide, $l$, actuated as will be presently described. Above the pin $f$ is a tubular header, $m$, whose shank is fixed to a vertical slide-rod, $n$, connected to one end of a lever, $o$, the other end of said lever being connected by a suitable link with a crank, $p$, on the driving-shaft $q$. The blank from which the tube is to be formed is cut from a plate to the shape seen in Fig. 4, with two inclined and parallel ends, $r$ and $s$, and this blank being bent, as seen in Fig. 5, is placed on the pin $f$. As the header then descends it passes over the head of the former, and its bottom and annular face striking the top of the blank, the blank being at a welding heat, compresses the blank in the direction of its length, and driving the edges $r$ and $s$ together, welds them. The header then rises, and two dies, $t$ $u$, on opposite sides of the pin, are driven forward against the blank. These dies have inner cylindric faces shaped to the outer circumference to be possessed by the tube, the thickness of the dies being equal to or a little in excess of the length of the tube. The dies are fixed in the inner ends of two slides, $v$, which are jointed to levers $w$, said levers, by toggle-links $x$ and connections $y$, being jointed to one end of a lever, $z$, whose opposite end is connected to the crank $p$ by a link, $a^2$. The ratchet-slide $l$ is jointed to one of the levers $w$, and is moved forward and back by said lever. When the header $m$ is descending the dies $t\ u$ draw back, and after the header has acted and risen from the tube the dies are driven forward, and acting upon the sides of the tube correct its shape. Before the header again acts, or before the dies next act, the lever $w$ actuates the pawl, and turns the pin $f$ and blank $h$ slightly, and thus the dies and header have a uniformity of action over the whole surface of the blank, so that by the action of the machine the tube is both welded and shaped without any subsequent action. The tube having been thus formed and shaped, the pin $f$, with the tube upon it, is removed and replaced by another pin and another blank, the tube being started from the removed pin, as already explained.

For forming tubes varying in size, a series of pins and headers are used, as will be readily understood.

The details and arrangement of the mechanism may, of course, be varied.

I claim—

1. The described method of forming coupling-tubes, &c., consisting in first cutting the blank to the shape described and shown in Fig. 4, and then when the same is at a welding-heat, and bent as shown in Fig. 5, automatically welding the inclined edges $r\ s$ by end pressure upon the tube.

2. In combination with the socket-header $m$, operating to give endwise pressure upon the tube to weld its heated inclined sides $r\ s$, the dies $t\ u$, operating in alternation with the header $m$ to shape the tube at its circumference.

GEO. H. FOX.

Witnesses:
 FRANCIS GOULD,
 M. W. FROTHINGHAM.